United States Patent [19]

Alferness

[11] 4,448,479
[45] May 15, 1984

[54] TRAVELING WAVE, ELECTROOPTIC DEVICES WITH EFFECTIVE VELOCITY MATCHING

[75] Inventor: Rodney C. Alferness, Holmdel, N.J.

[73] Assignee: Bell Telephone Laboratories, Incorporated, Murray Hill, N.J.

[21] Appl. No.: 321,475

[22] Filed: Nov. 16, 1981

[51] Int. Cl.³ .............................................. G02B 5/174
[52] U.S. Cl. ................................. 350/96.14; 350/96.13
[58] Field of Search ............... 350/96.11, 96.12, 96.13, 350/96.14

[56] References Cited

U.S. PATENT DOCUMENTS

| | | | |
|---|---|---|---|
| 4,005,927 | 2/1977 | Caton | 350/96.14 |
| 4,251,130 | 2/1981 | Marcatili | 350/96.14 |
| 4,372,643 | 2/1983 | Liu et al. | 350/96.14 |
| 4,380,364 | 4/1983 | Marcatili | 350/96.14 |
| 4,381,139 | 4/1983 | Alferness | 350/96.14 |

OTHER PUBLICATIONS

Schmidt et al., *Optics Letters*, vol. 2, No. 2, Feb. 1978, "Efficient Optical Waveguide Switch/Amplitude Modulator", pp. 45–47.

IEEE Journal of Quantum Electronics, vol. QE-12, No. 7, Jul. 1976, "Switched Directional Couplers with Alternating $\Delta\beta$", pp. 396–401.

*Primary Examiner*—John D. Lee
*Assistant Examiner*—Frank González
*Attorney, Agent, or Firm*—Sylvan Sherman; Gregory C. Ranieri

[57] ABSTRACT

A simulated velocity match between a traveling optical wave and a traveling electrical modulating wave is obtained in traveling wave, velocity mismatched electrooptic devices by introducing, at longitudinally spaced intervals along the electrical signal wavepath, means for producing the equivalent of a 180 degree phase shift in the effect of the modulating signal upon the operative electrooptic parameter of said device. This technique is employed to minimize the effect of walk-off due to velocity mismatch in modulators, phase shifter and mode converters.

10 Claims, 12 Drawing Figures

TRAVELING WAVE, ELECTROOPTIC DEVICES WITH EFFECTIVE VELOCITY MATCHING

TECHNICAL FIELD

This application relates to traveling wave, electrooptic devices.

BACKGROUND OF THE INVENTION

In U.S. Pat. Nos. 4,005,927 and 4,251,130 and 4,372,643, gating circuits of the velocity matched type (VMG) are disclosed. In the cited patents, gating is produced by a traveling electrical modulating signal that propagates in synchronism with an optical signal. These are the so-called "traveling wave, velocity matched gates" (TW-VMG). In U.S. Pat. No. 4,372,643, the electrical circuit is tuned so as to produce a standing electrical wave. However, the two oppositely propagating waves that produce the standing wave are also velocity matched to the optical signal. This class of device is the so-called "standing wave, velocity matched gate" (SW-VMG).

It is a general problem with both traveling wave and standing wave gates and with electrooptic modulators generally that the refractive indices of the substrate material in which the gate is formed are very different at the two frequencies of interest, i.e., the electrical signal and optical signal frequencies. As a consequence, the electrical wavepath must be specially designed in order to satisfy the velocity match requirement, and to the extent that the velocities of the two signals are not carefully matched, the switching or modulation efficiency degenerates significantly.

In an alternative approach, described in U.S. Pat. No. 4,380,364 no attempt is made to satisfy the velocity match requirement. Instead, a velocity match is simulated in a basically velocity mismatched, standing wave gate structure by shaping the electrical signal wavepath so that interaction between the electrical signal with the optical signal occurs only along selected regions of the electrical signal wavepath. More specifically, whenever the phase of the electrical signal (i.e., the electric field direction) would tend to interfere with the desired transfer of optical power between the coupled optical waveguides, the electrodes are physically displaced so that there is no longer any interaction between the electrical field and the optical signal.

The principle disadvantage of this arrangement resides in the added loss produced by the increased length of the electrodes. This loss, in turn, causes an attenuation in the amplitude of the modulating signal as it propagates along the electrodes. As a result, a signal source of greater power is required, and, for a given amplitude of modulating signal, a longer gate structure is required. In addition, an electrode configuration of this type occupies more space than the usual electrodes, thus increasing the surface area occupied by the device.

The broad object of the present invention is to overcome the limitation of walk-off without significantly increasing or complicating the electrode structure.

SUMMARY OF THE INVENTION

In accordance with the present invention, the effect of walk-off is minimized in traveling wave, electrooptic devices by producing, at longitudinally spaced intervals, a 180 degree phase (i.e., polarity) reversal in the effect the modulating signal has upon the operative parameter of such devices. Thus, in a traveling wave modulator comprising a pair of coupled waveguides wherein the coupling efficiency is controlled by modulating the difference, $\Delta\beta$, in the propagation constants of the two waveguides, the effect of walk-off is obviated by producing a phase reversal in the sign of $\Delta\beta$ at specified intervals along the coupled waveguides. In a phase shifter, where the relative phase of the TE and TM modes is controlled by modulating the difference in the propagation constants of these two modes, a reversal in the sign of this difference is similarly effected at specified longitudinally spaced intervals.

The effect of walk-off in a TE$\rightleftharpoons$TM mode converter is minimized by inducing a phase reversal in the sign of the electrooptically induced TE$\rightleftharpoons$TM coupling coefficient, which is the operative electrooptically modulated parameter for this device.

Electrode arrangements for producing the phase reversals in the several devices are described.

It is an advantage of the invention that the total length of the electrical modulating wavepath is substantially equal to the optical wavepath.

DETAILED DESCRIPTION

Modulators

Figure 1:
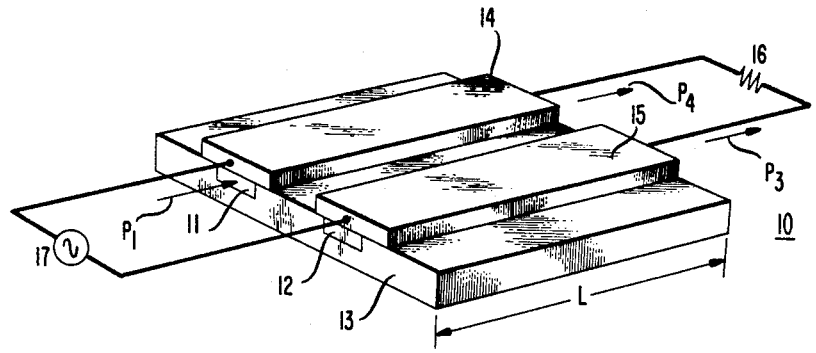
FIG. 1 shows a prior art traveling wave, velocity matched gate.

The operation of both the prior art velocity matched modulator and an embodiment of the instant modulator is based upon controlling the transfer efficiency between a pair of coupled wavepaths. For purposes of explanation and illustration, reference will be made to electrical and optical signals, and electrical and optical wavepaths. However, it should be understood that the principles of the invention are equally applicable to any kind of interacting wavepaths including, for example, electron beams, solitons, phonons, etc. In addition, such interaction can occur at any frequency. With these facts in mind, reference is now made to FIG. 1 which shows a prior art TW-VMG of the type disclosed in the above-cited Marcatili U.S. Pat. No. 4,251,130. The gate comprises an optical directional coupler 10 including a pair of essentially identical dielectric waveguides 11 and 12 embedded in an electrooptic substrate 13 of lower refractive index. The guides are coupled over an interval L, where the coupling coefficient per unit length, k, and the coupling interval L are related by $$kL = \pi/2 \quad (1)$$

Modulating means for varying the transfer efficiency between the guides comprises a pair of electrodes 14 and 15 which, in the illustrated embodiment, are located directly over the optical waveguides 11 and 12, respectively. The electrodes form an electrical transmission line that is terminated at its output end by a resistor 16 whose magnitude is equal to the characteristic impedance of the line, and is energized at its input end by a signal source 17.

In the absence of a modulating electric signal from source 17, the propagation constants, $\beta_1$ and $\beta_2$ of the two waveguides 11 and 12 are equal. As a result, an optical signal $P_1$, applied to one end of guide 11, is completely coupled to waveguide 12. If, however, an electric field is applied between the electrodes, the propagation constants $\beta_1$ and $\beta_2$ are locally perturbed due to the electrooptic effect. Thus, at any point x along the coupler, the propagation constant varies as a function of time t. Assuming a sinusoidal electrical signal of period T, the difference in phase constants $\Delta\beta$ is given by $$\Delta\beta = \beta_1 - \beta_2 = \frac{4\pi\Delta n}{\lambda_0}\left(\sin\frac{2\pi}{T}\left(\frac{x}{V_{rf}} - t\right)\right); \quad (2)$$

where
$\lambda_0$ is the free space wavelength of the optical signal;
$V_{rf}$ is the phase velocity of the electrical signal; and
$\Delta n$ is the maximum index change introduced in each of the guides by the electrical field.

The pertubation represented by equation (2) propagates along the optical wavepaths along with the optical signal. In the velocity matched coupler, the perturbation and the optical signal propagate at the same velocity. Hence, light entering the system at any particular instant sees the same propagation constant difference throughout. In particular, light entering at a time when the modulating voltage is zero sees a $\Delta\beta$ which is and remains zero, resulting in a complete transfer of energy between wavepaths. At all other instants, $\Delta\beta$ has some finite value such that there is less than complete transfer of the incident light.

If, on the other hand, the electrical and optical waves are not synchronized, photons entering the coupler see a constantly changing $\Delta\beta$ as they propagate therealong. However, by the appropriate design of the coupler, this effect can be utilized to produce an alternating $\Delta\beta$ coupler of the type described in an article by H. Kogelnik and R. V. Schmidt entitled "Switched Directional Couplers with Alternating $\Delta\beta$", published in the July 1976 issue of the *IEEE Journal of Quantum Electronics*, Vol. QE-12, No. 7, pages 396–401. This effect is employed by Marcatili in a standing-wave, velocity-mismatched gate, as explained in his above-identified application. Thus, in all cases, conditions must be established in which the coupling efficiency is controlled as a function of time.

The present invention provides a means for controlling the transfer of signal power between coupled guides in a traveling-wave, velocity-mismatched device by shaping the electrical signal wavepath so as to introduce the equivalent of a 180 degree phase reversal in $\Delta\beta$ at appropriate spaced intervals along the modulating signal wavepath. The effect of this is to negate the effects of walk-off between the optical and modulating-waves due to the velocity mismatch. Stated positively, the phase reversals simulate a velocity match to the extent that the $\Delta\beta$, while not a constant over the coupling interval, at least does not change sign for those photons entering the system at a particular phase of the modulating signal. As a consequence, there is a constructive contribution from each interval for appropriately phased signals, rather than a cancelling effect that would otherwise be suffered because of walk-off.

Figure 2:
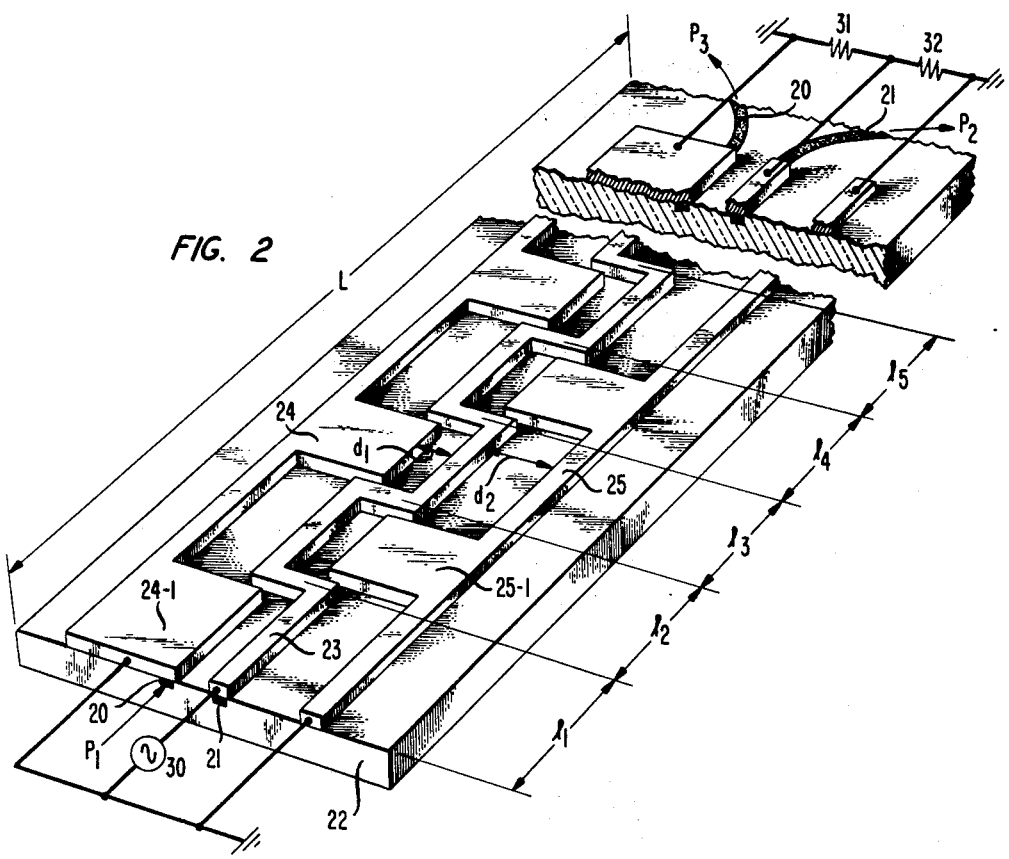
FIG. 2 shows a first embodiment of the invention.

FIG. 2, now to be considered, is illustrative of a first embodiment of the invention in which the above-described phase reversals are produced by a particular arrangement of electrodes. As in the prior art, the coupled waveguides 20 and 21 are a pair of substantially identical, parallel optical waveguiding regions embedded in a substrate 22 of lower refractive index. Superimposed upon the substrate and the optical waveguides are three conductive electrodes 23, 24 and 25 which extend coextensively along an interval L of the optical wavepaths, where the interval L is the coupling interval, as defined by equation (1).

In this embodiment, the electrodes comprise an inner, meandering electrode 23, and the two outer finger electrodes 24 and 25 which, together, form a coplanar strip transmission line.

The inner electrode meanders so as to extend alternately over each of the optical wavepaths 20 and 21 where the lateral transitions occur at uniformly spaced longitudinal intervals $l_0$, called the coherence length, given by $$l_o = \frac{\lambda_{rf}}{2n_{rf}}\left[1 - \frac{V_{rf}}{V_o}\right]^{-1} \quad (3)$$

where
$\lambda_{rf}$ is a specified electrical free space wavelength;
$n_{rf}$ and $V_{rf}$ are, respectively, the effective refractive index and velocity of propagation at said wavelength;
$V_0$ is the propagation velocity of the optical signal.

The outer finger electrodes 24 and 25 are positioned along the coupling interval such that the fingers of the respective electrodes extend over those portions of the optical wavepaths not covered by the inner electrode. For example, along the first interval, $l_1$, the inner electrode 23 extends over wavepath 21. Accordingly, finger 24-1 of electrode 24 extends over the coextensive portion of the other wavepath 20. Along the second interval, $l_2$, the inner electrode 23 extends over wavepath 20 and finger 25-1 of electrode 25 extends over the corresponding portion of wavepath 21.

In order to confine the electric field to the region of the optical wavepaths, the space, $d_1$, between the inner electrode 23 and the adjacent finger is much less than the space, $d_2$, between the inner electrode 23 and the coextensive portion of the other electrode. The transitions themselves are made as abruptly as possible. It should also be noted that the dimension $d_1$ in a typical optical modulator is only a few microns, which is orders of magnitude smaller than the wavelength of the modulating electrical signal. As such, the undulations of the electrodes constitute an insignificant perturbation along the propagation path of the modulating signal.

As will be explained in greater detail hereinbelow, the lengths $l_1$ of the first and last electrode intervals can have any value less than $l_0$, as given by equation (3). The remaining intervals $l_2, l_3 \ldots$, on the other hand, are all equal to $l_0$. For purposes of explanation, however, it will be assumed that all the intervals are equal to $l_0$.

The transmission line formed by the electrodes is energized at its input end by a signal source 30, and is terminated at its output end by an impedance 31, 32 equal to its characteristic impedance.

As explained hereinabove, in the absence of a modulating signal from signal source 30, the propagation constants $\beta_1$ and $\beta_2$ of the optical waveguides 20 and 21, respectively, are equal and constant over the entire coupling interval L. Accordingly, an optical signal $P_1$, applied at one end of waveguide 20, is completely transferred to the second waveguide 21, and exits as signal $P_2$ at the other end thereof, where $P_2 = P_1$. If, however, the electrodes are energized, the resulting electric field propagating along the electrodes locally perturbs the propagation constants $\beta_1$ and $\beta_2$ due to the electrooptic effect. Thus, at every point along the coupler, the propagation constants of the two optical waveguides vary as a function of time. More specifically, because the electric fields in the two waveguides are oppositely directed, the two propagation constants are affected differently. Typically one is increased while the other is decreased relative to their zero field values. Consequently, the net power transfer between the two waveguides, which varies as a function of the integral of the phase constants difference, $\Delta\beta = \beta_1 - \beta_2$, is modulated by the electric signal.

As explained hereinabove, in the velocity matched gate, the $\Delta\beta$ seen by photons entering the input waveguide remains constant over the entire coupling interval inasmuch as the optical wave and the modulating wave propagate in synchronism. In the case of a velocity mismatch, the two waves do not propagate in synchronism, producing what is referred to as a "walk-off" effect. In the instant case, where the optical wave propagates at a faster rate than the electrical signal, photons entering at any instant tend to "catch up" with the propagating electrical wave. As a result, in the absence of any compensating arrangements, the electric field variations, and the induced $\Delta\beta$ variations seen by the photons as a function of distance along the coupler, vary in a manner illustrated by curves 40 and 41 in FIG. 3. The particular $\Delta\beta$ variation depicted by curve 40 is for photons entering at the instant the modulating signal is at zero amplitude, as represented by curve 50 in FIG. 4. Because the optical signal propagates more rapidly than the electrical signal, these photons catch up with portions of the previously applied modulating signal depicted by the $-t$ portion of curve 50. In particular, in an interval $2l_0$ the photons see a complete modulating voltage cycle, and the corresponding $\Delta\beta$ variations, where $l_0$ is as given by equation (3). It will be noted that for a sinusoidal modulating signal, $\Delta\beta$ changes sign within this spatial period.

Figure 3:
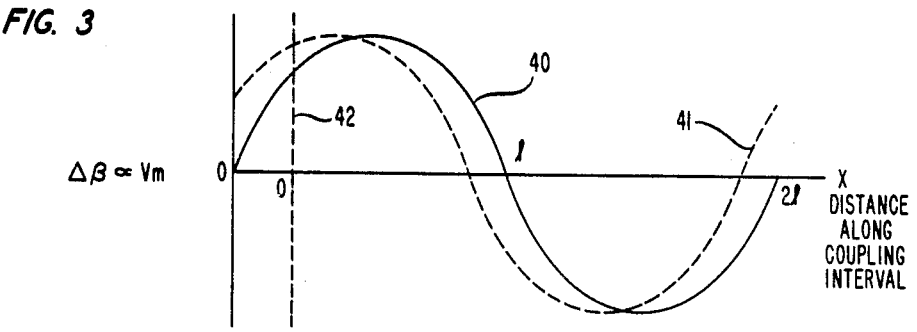
FIG. 3 shows the variations in $\Delta\beta$ as seen by photons entering the modulator at two different phases of the modulating signal.
Figure 4:
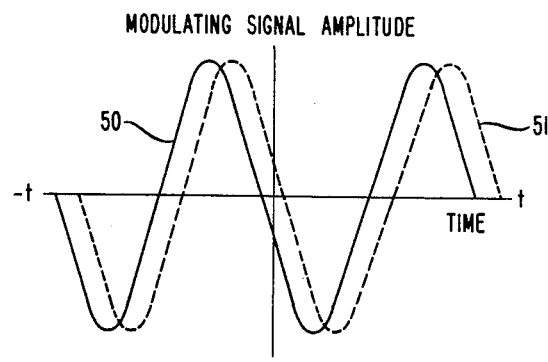
FIG. 4 shows variations of the amplitude of the modulating signal as a function of time.

A similar $\Delta\beta$ variation occurs for photons incident at other times during the modulating signal cycle, as indicated by curve 41 in FIG. 3. This is equivalent to a phase shift in the modulating signal as represented by curve 51 in FIG. 4.

Both of the curves 40 and 41 in FIG. 3 illustrate the effect of walk-off on $\Delta\beta$. Inasmuch as the throughput efficiency is a function of the integral of $\Delta\beta$ over the coupling interval, it is apparent that the net effect of an alternating $\Delta\beta$ is to minimize the integrated value of $\Delta\beta$ and, thus the throughput, where throughput efficiency $\eta$ is the ratio of the output power to the input power as measured along the same wavepath. Referring to FIG. 2, $$\eta = (P_3/P_1) \tag{4}$$

Figure 5:
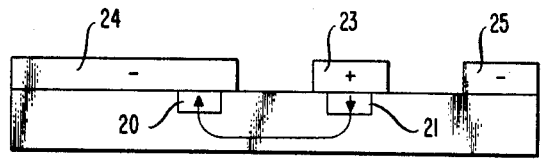
FIGS. 5 and 6, included for purposes of explanation, show the electric field directions in two adjacent intervals along the modulator.
Figure 6:
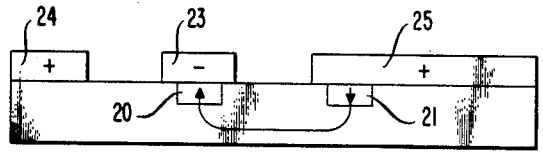

To increase $\eta$ requires that the integral of $\Delta\beta$ be maximized. This is done, in accordance with the present invention, by reversing the effect of the electric field upon $\Delta\beta$. That is, whenever a change in the sign of $\Delta\beta$ would occur, as viewed by a photon that entered the system at a prescribed instant, the electrodes are relocated so as to maintain the same electric field direction in the electrooptic material, thus maintaining the same polarity of $\Delta\beta$. This is illustrated in FIGS. 5 and 6 which show cross sections of the coupler along a pair of adjacent intervals. For example, FIG. 5 shows the electrodes and the electric field distribution as it would appear along the first interval $l_1$ when the inner electrode 23 is positive with respect to the finger electrodes 24 and 25. The field primarily extends from electrode 23 down through optical waveguide 21 and then up through waveguide 20 to electrode 24. In the next interval $l_2$, the phase of the electric field, as seen by the same photons, has reversed, as indicated in FIG. 3, because of walk-off. Thus, the inner electrode is now negative with respect to the finger electrodes, as indicated in FIG. 6. However, because the inner electrode is shifted in interval $l_2$ from over waveguide 21 to waveguide 20, and finger electrode 25 now extends over waveguide 21, the direction of the electric field in the respective waveguides remains the same, i.e., down in waveguide 21 and up in waveguide 20. Insofar as $\Delta\beta$ is concerned, it is as if the phase of the electric field along the electrodes has been reversed, resulting in the $\Delta\beta$ curve 70 shown in FIG. 7. It will be particularly noted that with respect to photons entering the system when the amplitude of the modulating signal is zero, $\Delta\beta$ does not reverse sign throughout the coupling interval. The result is to maximize the integral of $\Delta\beta$ and, thereby, maximize the throughput efficiency. Thus, in this sense, a velocity match has been simulated.

Figure 8:
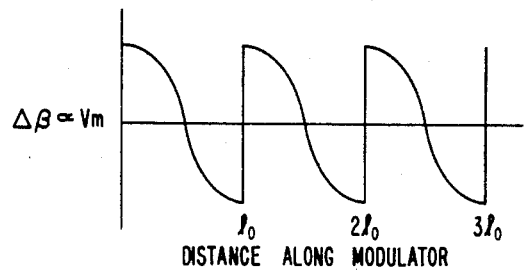

On the other hand, photons entering the system when the amplitude of the modulating signal is maximum see the $\Delta\beta$ distribution shown in FIG. 8 which includes equal positive and negative intervals. For this case, the integrated $\Delta\beta$ is zero, and the throughput as defined in equation (4), is correspondingly low. For other phases of the modulating signal, the throughput is varied between zero and maximum. Thus, modulation of the optical wave is achieved.

Phase Shifter

Figure 9:
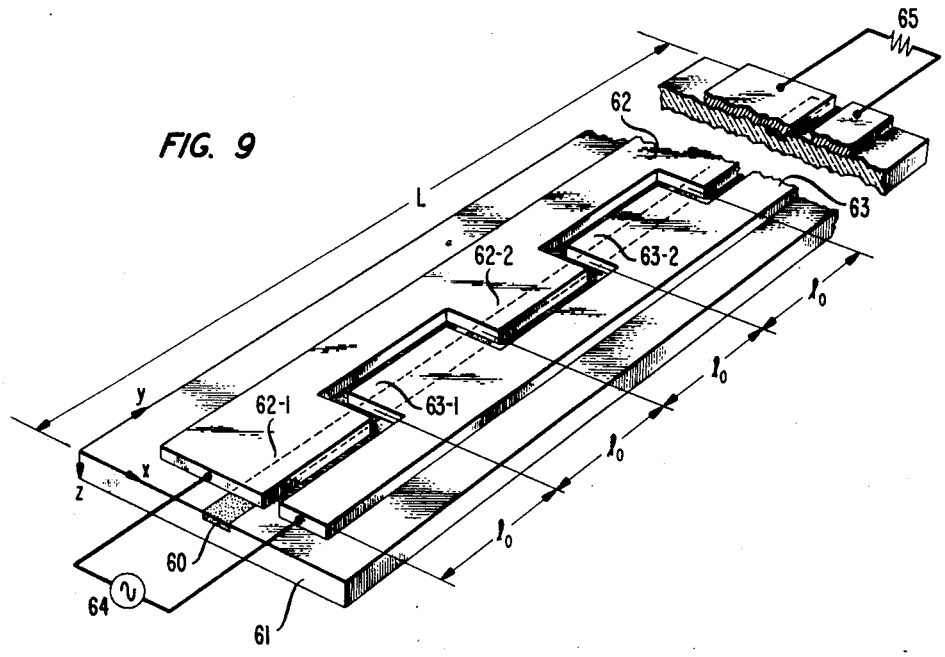
FIG. 9 shows a phase shifter in accordance with the invention.

The principles of the invention can also be used to obviate the effect of walk-off in a phase shifter. In such a device the operative electrooptically modulated parameter is the difference between the phase constants of the TE and the TM modes of wave propagation. FIG. 9, now to be considered, shows a phase shifter comprising an optical waveguiding strip 60 embedded in a substrate 61 of lower refractive index birefringent material, and means for modulating the relative propagation constants of the two modes by means of the electrooptic effect. In the embodiment of FIG. 9, this modulation is affected by means of a pair of conductive finger electrodes 62 and 63 superimposed upon the substrate and waveguiding strip. The electrodes extend coextensively over an interval L of the optical wavepath and are arranged relative to each other such that the fingers 62-1, 62-2 ... 62-N of electrode 62 and the fingers 63-1, 63-2 ... 63-N are interleaved. The width, $l_0$, of each finger along the direction of wave propagation is as given by equation (3).

The transmission line formed by the electrodes is energized at its input and by a signal source 64 and is terminated at its other end by an impedance 65 equal to its characteristic impedance.

In operation, an optical signal of arbitrary polarization, propagating along strip 60 can be resolved into two orthogonally polarized TE and TM components. For a z- cut crystal material, the phase shift for each of the modes is proportional to the integral of $\Delta\beta$ over the interval L where $$\Delta\beta_{TE} \alpha r_{13} E_z;$$

$$\Delta\beta_{TM} \alpha r_{33} E_z; \quad (5)$$

$r_{13}$ and $r_{33}$ are the electrooptic coefficients;

$E_z$ is the z-directed component of the modulating signal within strip 60.

It is apparent from FIGS. 7 and 8, and the discussion hereinabove, that the phase shift is maximum for photons entering at the zero crossover points of the modulating signal and zero for those entering a quarter cycle later. Accordingly, the resulting phase shift can be modulated by the electrical signal. This phase modulation can then be converted to intensity modulation by the use of appropriate polarizers placed before and after the phase shifter. Alternatively, an interferometer waveguide circuit can be used with the phase shifter to effect intensity modulation.

Mode Converter

Figure 10:
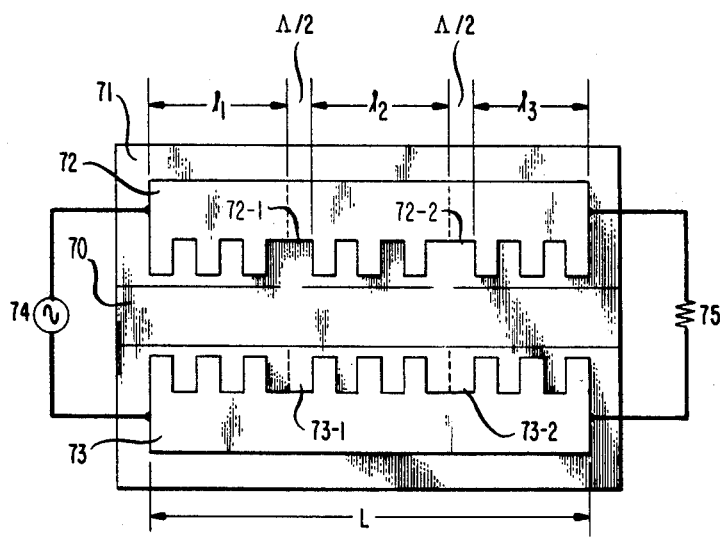
FIG. 10 shows a mode converter in accordance with the invention.

FIG. 10 illustrates the application of the principles of the invention to a TE⇌TM mode converter of the types described, for example, in U.S. Pat. No. 3,877,782. Typically, the mode converter includes a waveguiding strip 70 embedded in a substrate 71 of lower refractive index electrooptic material. A pair of electrodes 72, 73 are suitably disposed along a portion L of strip 70. A modulation signal source 74 is connected to one end of the electrodes, and a matching terminating impedance 75 is connected to the other end.

Because of the difference in the refractive indices seen by the two modes, finger electrodes are employed to produce a phase match between the optical TE and TM modes where the spatial period, $\Lambda$, of the fingers is given by $$\frac{1}{\lambda_o}[N_{TE} - N_{TM}] = \frac{1}{\Lambda} \quad (6)$$

where $\lambda_0$ is the wavelength of the optical frequency of interest; and $N_{TE}$ and $N_{TM}$ are the effective refractive indices seen by the TE and TM modes.

Depending upon the cut of the substrate material, the electrode fingers are either interleaved or arranged opposite each other, as shown in FIG. 10.

In a conventional mode converter, in which a uniform potential difference is impressed across the electrodes, the spatial period $\Lambda$ of the electrode fingers is typically uniform over the length of the electrodes, although some spatial tapering may be included as a means of broadbanding the converter response. However, in a traveling wave mode converter, where the electrical and optic signals are not velocity matched, the added problem associated with walk-off must be taken into account. In particular, as in the case of the modulator and the phase shifter, as the faster propagating optical signal passes the slower propagating electrical signal, there are successive polarity reversals in the electric field at intervals, $l_0$, as illustrated in FIG. 3, and corresponding reversals in the resulting electrooptic effect. That is, in the absence of some corrective measure, whatever mode conversion occurred in the first interval, $l_1$ would be undone by the mode conversion in the second interval, $l_2$. To prevent this, the equivalent of a 180 degree phase reversal in the effect of the modulating field on the mode-to-mode coupling coefficient is introduced at the appropriate intervals along the electrodes. In the illustrative embodiment, the phase-matched component of the coupling coefficient is $k_0 \exp(j2\pi z/\Lambda)$. To compensate for the polarity reversal of the electric field, a compensating reversal in the coupling coefficient is effectuated by introducing an additional space 72-1, 73-1, 72-2, 73-2, equal to $\Lambda/2$, following each of the intervals $l_1, l_2, \ldots$. When this is done, the coupling coefficient in each successive interval is the negative of what it would have been in the absence of the added space. That is $$k_o \exp\left[j\frac{2\pi}{\Lambda}\left(z + \frac{\Lambda}{2}\right)\right] = -k_o \exp\left[j\frac{2\pi z}{\Lambda}\right], \quad (7)$$

thus providing the desired compensation.

It should be noted that the finger-to-finger spacing $\Lambda$ is much smaller than the coherence length $l_0$. Thus, while each of the intervals $l_1, l_2$ and $l_3$ are shown to include three fingers, in general there will be many more than three. It will be also noted that $l_0$ may not be an exact integral multiple of $\Lambda$. In that case, the value of $l_0$ closest to an integral number of spatial wavelengths is chosen. This will correspond to a very small change in the design wavelength of the modulating signal $\lambda_{rf}$.

In the illustrative embodiment of FIG. 10, each interval $l_1, l_2 \ldots$ ends with a space and, therefore, a space is added to provide the additional half spatial period. It will be recognized however that if the intervals ended in a finger, the added half period would be provided by the addition of an added finger.

A quantitative measure of the operation of the above-described devices can be obtained by expressing the modulating voltage $E(z,t)$, as a function of distance, z, along the modulator electrodes and time t as follows:

$$E(z,t) = E_0 \sin(kz - \omega t - \phi) \quad (8)$$

where $E_0$ is the maximum amplitude of the modulating signal; and $$k = \frac{2\pi n_{rf}}{\lambda_{rf}}.$$

Also noting that $$V_{rf} = \frac{\lambda_{rf}}{T n_{rf}}$$

and

-continued $$\omega = 2\pi f_{rf}$$

we obtain $$E(z,t) = E_o \sin 2\pi f_{rf}\left(\frac{z}{V_{rf}} - t + \phi'\right) \quad (9)$$

Photons entering at time $t_0$ will have reached a point $z$ along the electrodes at a time $t$ given by $$z = V_0(t - t_0) \quad (10)$$

Substituting for $t$ from equation (10) in equation (9), we obtain $$E(z,t_o) = E_o \sin 2\pi f_{rf}\left[z\left(\frac{1}{V_{rf}} - \frac{1}{V_o}\right) - t_o + \phi_o'\right] \quad (11)$$

Equation (11) relates the voltage, $E(z,t_0)$, seen by photons entering at any arbitrary instant, $t_0$, as a function of distance, $z$, along the electrodes. Inasmuch as the operative electrooptic effect is proportional to the electrode voltage, equation (11) is also a measure of the perturbation seen by these photons. For the photons not to see a change in the sign of the electrooptic effect as they propagate along requires that the sign of $E(z,t_0)$ does not reverse as $z$ is varied. Assuming the photons enter at $t_0=0$, equation (11) reduces to $$E(z,0) = V_o \sin 2\pi f_{rf}\left(\frac{1}{V_{rf}} - \frac{1}{V_o}\right) \quad (12)$$

$E(z,o)$ will not change sign if $$2\pi f_{rf}\left(\frac{1}{V_{rf}} - \frac{1}{V_o}\right) z \leq \pi \quad (13)$$

or $$z \leq \frac{1}{2f_{rf}}\left(\frac{1}{V_{rf}} - \frac{1}{V_o}\right)^{-1} \quad (14)$$

Figure 7:
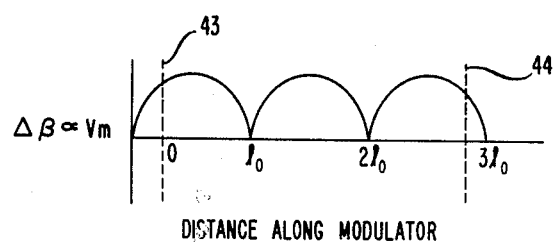
FIGS. 7 and 8 show the $\Delta\beta$ variations as a function of distance for photons entering at different times.

Noting that $$\frac{V_{rf}}{f_{rf}} = \frac{\lambda_{rf}}{n_{rf}},$$

we obtain $$z = l_o = \frac{\lambda_{rf}}{2n_{rf}}\left[1 - \frac{V_{rf}}{V_o}\right]^{-1} \quad (15)$$

which is the expression for the coherence length given by equation (3) above, and verifies what was demonstrated in FIGS. 7 and 8. That is, for the specified transition interval, $l$, there is no reversal in the sign of $\Delta\beta$ or $k$ for photons entering at the zero crossover points of the modulating signal. More specifically, for the rf wavelength, $\lambda_{rf}$, corresponding to $l_0$, the effect of walk-off between the optical and rf signals is not important for electrode lengths less than, or equal to $l_0$.

The usefulness of the instant invention in overcoming walk-off can be demonstrated analytically as follows. Equation (11) can be rewritten in terms of $l_0$ and an indication of the effective modulation depth obtained as a function of the modulation frequency, $f_{rf}$, by integrating over the total electrode length, L. This yields the following two equations:

(a) For an even number of reversal intervals (i.e., $L = l_0(n+1)$, where n is an odd integer):

$$Edz = \quad (16)$$

$$\frac{E_o l_o}{\alpha}\left(\cos(n+1)\alpha - \frac{\cos n\alpha}{\cos \alpha}\right)\{\cos(2\pi ft_o + (n+1)\alpha)\}.$$

(b) For an odd number of reversal intervals (i.e., $L = l_0(n+1)$, where n is an even integer):

$$Edz = \quad (17)$$

$$\frac{E_o l_o}{\alpha}\left(\frac{\sin n\alpha}{\cos \alpha} - \sin(n+1)\alpha\right)\{\sin(2\pi ft_o - (n+1)\alpha)\};$$

where
$\alpha = \pi f_{rf}/2f_0$; and
$f_0$ is the design frequency for velocity matching.

It will be noted that each of the equations (16) and (17) includes an amplitude term which is a function of the modulating frequency, $f_{rf}$; a time-varying term which is a replica of the modulating signal; and a phase shift which is a function of the modulation frequency, $f_{rf}/f_0$. It will also be noted that for $t_0 = (1/4f_0)$, and $f_{rf} = f_0$, which is the condition depicted in FIG. 8, the integrated value of $\Delta\beta$ is zero, as shown in the figure.

Figure 11:
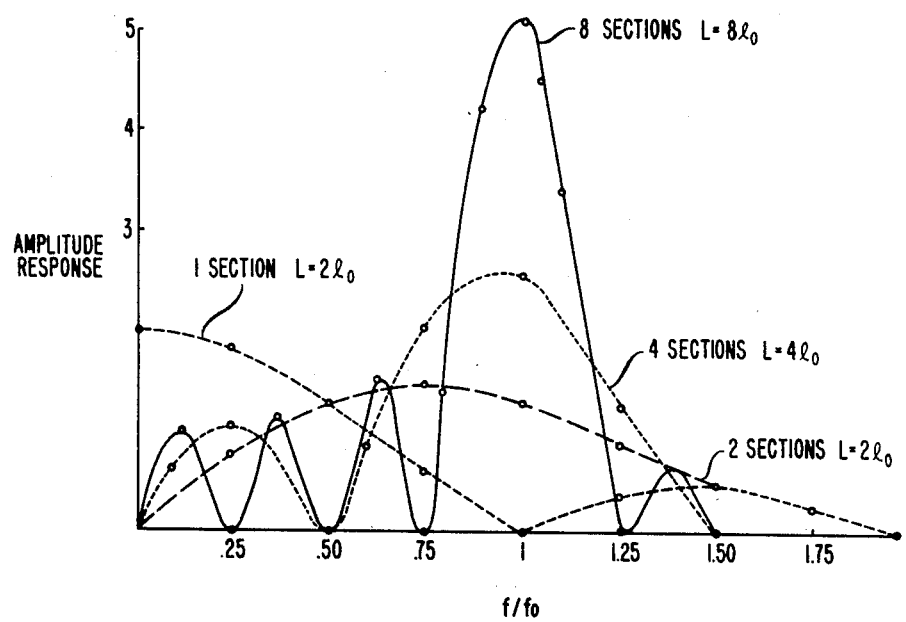
FIG. 11 shows the amplitude-frequency response of devices having different numbers of sections.

FIG. 11 shows the variations in the amplitude response as a function of the normalized modulation frequency, $f_{rf}/f_0$, for devices having 2, 4 and 8 sections. Also shown are the results for an electrode of length $2l_0$ without walk-off compensating phase reversal. As can be seen, the effect of increasing the number of sections is to shift the modulation band from a low pass characteristic for no phase reversals to a bandpass characteristic centered at frequency $f_0$. For the uncorrected case no optical modulation is achieveable at $f_{rf} = f_0$. However, by using the proposed electrode as the number of sections increases, the amplitude response increases while the modulation bandwidth decreases. Therefore, the desired goal is achieved. The added lengths permit the use of lower modulating voltages without requiring a reduction in the frequency of the modulating signal.

Figure 12:
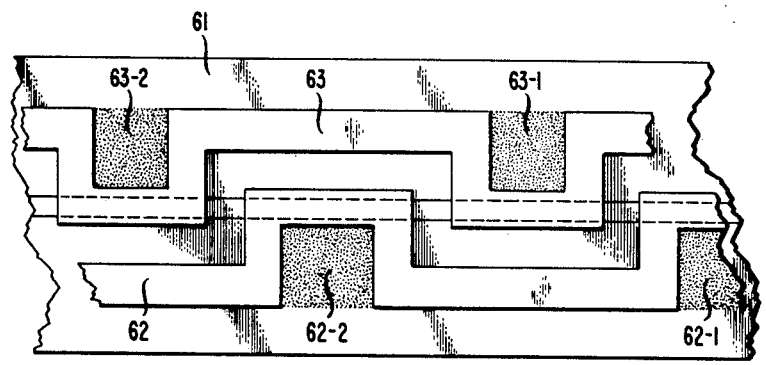
FIG. 12 shows an alternative electrode configuration.

In the embodiment of FIG. 2, the two outer electrodes 24 and 25 are shown and described as finger electrodes. Similarly, electrodes 62 and 63 in the embodiment of FIG. 9 are shown and described as finger electrodes. However, one can omit portions of these electrodes, and while this omission alters their appearance, it does not affect their operation. For example, FIG. 12 shows electrodes 62 and 63 in which the cross hatched portions 62-1 62-2, 63-1 and 63-2 have been omitted, converting the electrodes from a pair of finger electrodes to a pair of meandering electrodes of uniform width. For the purpose of this invention, these two are equivalents and serve to illustrate that the invention can be practiced employing various electrode configurations.

In the discussion above, it was assumed, for purposes of discussion, that all of the intervals were of equal length $l_0$. It was indicated, however, that the first interval and the last may be equal to or less than $l_0$. If, for example, the first interval is less than $l_0$, the effect is the equivalent of a phase shift in the modulation signal as indicated in FIGS. 3 and 7 by the shifted vertical axis 42 and 43. Similarly, if the last interval is less than $l_0$, the effect is to end the interaction interval at a point indicated by axis 44 in FIG. 7. However, in all other respects the devices will operate as described hereinabove.

What is claimed is:

1. An optical device comprising:
   optical waveguiding means;
   electrical waveguiding means extending longitudinally along said optical waveguiding means over an interaction distance L for locally modulating, via the electrooptic effect, the operative parameter of said device;
   said electrical waveguiding means having a total length substantially equal to L, and including, at longitudinally spaced interval therealong, means for producing the equivalent of a 180 degree phase shift in said operative parameter, said 180 degree phase shifts occurring at intervals spaced apart a distance, $l_0$, given by $$l_o = \frac{\lambda_{rf}}{2n_{rf}} \left(1 - \frac{V_{rf}}{V_o}\right)^{-1},$$

where $\lambda_{rf}$, $V_{rf}$, $n_{rf}$ are, respectively, the wavelength, velocity of propagation, and refractive index at a specified electrical wave frequency; and $V_0$ is the velocity of propagation at the frequency of the optical signal of interest.

2. The optical device according to claim 1 wherein:
   said device is a phase shifter;
   said optical waveguiding means is a single optical waveguide;
   and the operative parameter is the difference between the phase constant of the TE mode of wave propagation and the phase constant of the TM mode of wave propagation.

3. The optical device according to claim 2 wherein:
   said optical waveguiding means comprises a strip embedded in an electrooptical material of lower refractive index;
   and said electrical waveguiding means comprises a pair of metallic electrodes superimposed upon said substrate and extending longitudinally along said strip with one and then the other of said electrodes alternately extending over longitudinal intervals of said strip.

4. The optical device according to claim 3 wherein the first and the last of said intervals are equal to or less than the length $l_0$ of the intermediate intervals.

5. The optical device according to claim 1 wherein:
   said device is a modulator;
   said optical waveguiding means comprises a pair of coupled optical waveguides;
   and the operative parameter is the difference between the phase constant of the first of said waveguides and the phase constant of the other of said waveguides.

6. The optical device according to claim 5 wherein said electrical waveguiding means comprises a plurality of metallic electrodes including a center electrode and a pair of outer electrodes forming a strip transmission line extending longitudinally along said optical waveguides;
   said center electrode meandering along in the direction of optical wave transmission, alternately extending over longitudinal intervals of one and then the other of said optical waveguides;
   and wherein the outer electrodes extend over the optical waveguide not covered by said center electrode.

7. The optical device according to claims 2 or 5 wherein:
   said electrical waveguiding means comprises a plurality of electrodes forming a planar strip transmission line;
   and said 180 degree phase shift is obtained by means of a transverse displacement of said electrodes relative to said optical waveguiding means.

8. The optical device according to claim 1 wherein:
   said device is a TE$\rightleftarrows$TM mode converter;
   said optical waveguiding means is a single optical waveguide;
   and the operative parameter is the electrooptically induced mode-to-mode coupling coefficient.

9. The optical device according to claim 8 wherein:
   said electrical waveguiding means is a pair of finger electrodes having a nominal finger-to-finger spacing $\Lambda$;
   and said 180 degree phase shift is obtained by inserting an added interval along said electrodes equal to $\Lambda/2$.

10. The optical device according to claims 2, 5 or 8 wherein said electrical waveguiding means comprises a plurality of electrodes forming a planar strip transmission line.

* * * * *